United States Patent [19]

Forse

[11] Patent Number: 4,912,766

[45] Date of Patent: Mar. 27, 1990

[54] SPEECH PROCESSOR

[75] Inventor: Nicholas J. A. Forse, Ipswich, England

[73] Assignee: British Telecommunications public limited company, London, England

[21] Appl. No.: 55,966

[22] Filed: Jun. 1, 1987

[30] Foreign Application Priority Data

Jun. 2, 1986 [GB] United Kingdom ............... 8613327

[51] Int. Cl.$^4$ .............................................. G10L 5/00
[52] U.S. Cl. ........................................ 381/45; 381/47; 364/513.5; 370/104.1
[58] Field of Search .................................. 381/29–48; 364/513.5; 370/70; 375/98

[56] References Cited

U.S. PATENT DOCUMENTS

| | | | |
|---|---|---|---|
| 4,000,369 | 12/1976 | Paul et al. ............................ | 381/47 |
| 4,081,607 | 3/1978 | Vitols et al. ......................... | 381/45 |
| 4,262,355 | 4/1981 | Schiff ................................... | 370/69.1 |
| 4,696,040 | 9/1987 | Doddington et al. ............... | 381/46 |
| 4,757,502 | 7/1988 | Meuriche et al. .................... | 375/98 |

Primary Examiner—Emanuel S. Kemeny
Attorney, Agent, or Firm—Nixon & Vanderhye

[57] ABSTRACT

In a speech processor such as a speech recognizer, the problem of distortion of extracted features caused by adaptation of the input automatic gain control (AGC) during feature extraction is solved by storing the AGC's gain coefficient along with the energy level of each extracted feature. At the end of the sampling period the stored gain coefficients are set equal to the minimum stored coefficient and the associated energy levels adjusted accordingly. The AGC circuit may comprise a digitally switched attenuator under the control of a microprocessor performing the speech recognition.

19 Claims, 1 Drawing Sheet

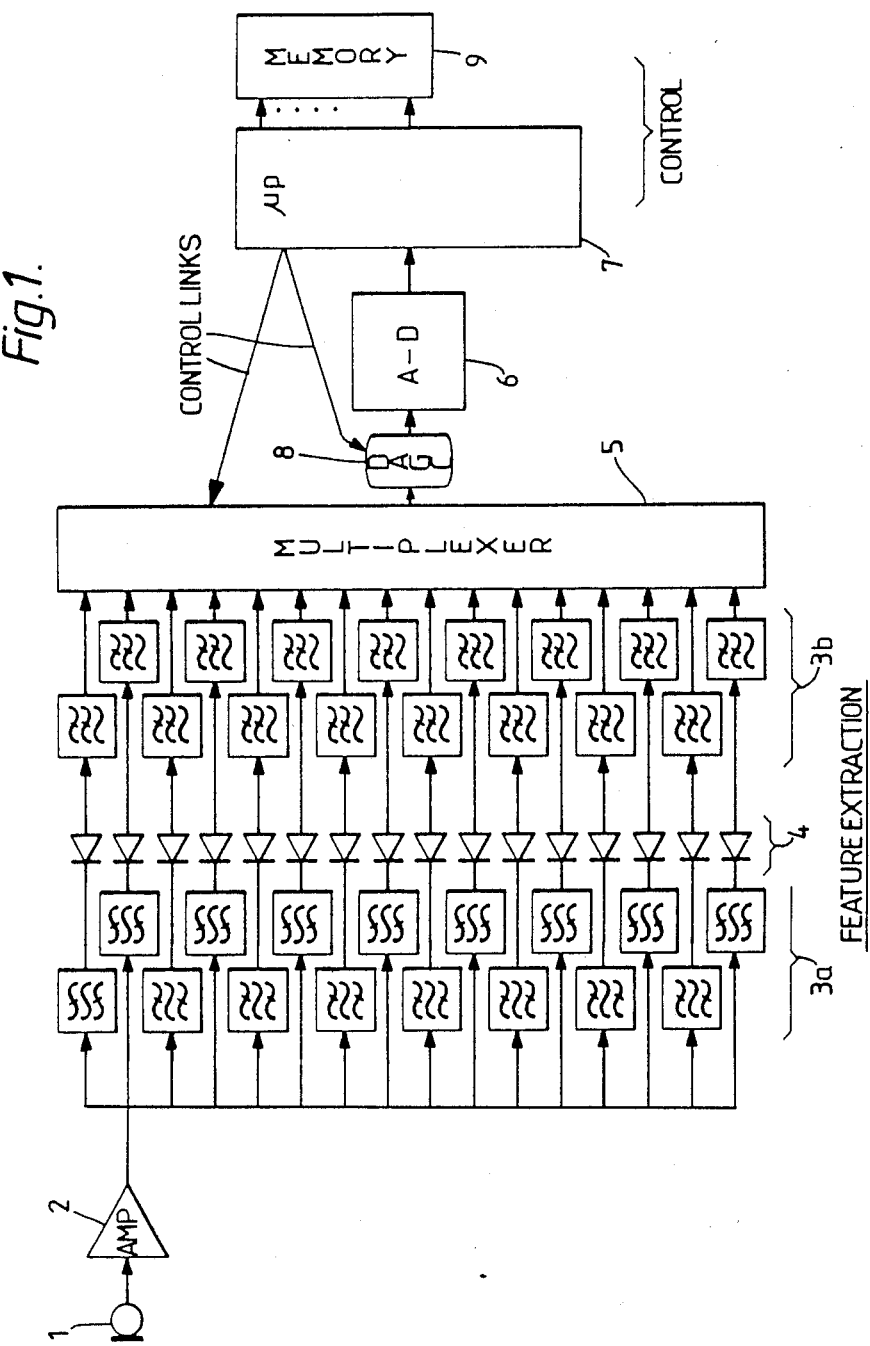

SPEECH PROCESSOR

This invention relates to speech processors having automatic gain control, and in particular to speech recognisers.

Automatic speech recognisers work by comparing features extracted from speech signals. Features extracted from the speech to be recognised are compared with stored features extracted from a known utterance.

For accurate recognition it is important that the features extracted from the same word or sound spoken at different times are sufficiently similar. However, the large dynamic range of speech makes this difficult to achieve, particularly in areas such as hands-free telephony where the sound level received by the microphone can vary over a wide range. In order to compensate for this speech level variation, most speech recognisers use some form of automatic gain control (AGC).

The AGC circuit controls the gain to ensure that the average signal level used by the feature extractor is as near constant as possible over a given time period. Hence quiet speech utterances are given greater gain than loud utterances. This form of AGC performs well when continuous speech is the input signal since, after a period of time, the circuit gain will optimise the signal level to give consistent feature extraction. However, in the absence of speech, the gain of the AGC circuit will increase to a level determined by the background noise, so that at the onset of a speech utterance the gain of the AGC circuit will be set too high. During the utterance the gain of the circuit is automatically reduced, the speed of the gain change being determined by the 'attack' time of the AGC. The start of the utterance is thus subjected to a much greater gain and any features extracted will have a much greater energy content than similar features extracted later, when the gain has been reduced.

This distortion effect is dependent on the input signal level; the higher the speech level the larger is the distortion. Hence the first few features extracted will not correspond to the notionally similar stored features, and this can often result in poor recognition performance.

The present invention seeks to provide a solution to this problem.

According to the present invention there is provided a speech processor comprising an input to receive speech signals; signal processing means to extract spectral parameters from said speech signals; an analogue to digital converter to digitise said extracted parameters; an automatic gain control means to control the signal level applied to said converter; characterised in that the spectral parameters are stored at least temporarily, and for each such stored parameter a gain coefficient indicative of the gain applied by the gain control means is also stored; and in that at the end of a sampling period the gain coefficients stored in that period are, if different, set equal to the lowest gain coefficient stored in that period, the magnitudes of the corresponding stored spectral parameters being adjusted proportionally.

In one form of speech processor according to the invention, configured as a speech recogniser, automatic gain control is provided by a digitally switched attenuator, the gain of which is determined by a microprocessor performing the speech recognition. The microprocessor controls the gain to ensure that the dynamic range of the Analogue to Digital converter (which occurs between feature extraction and the microprocessor controlling the recogniser even when analogue AGCs are used) is not exceeded (except during the adaption of the AGC). The principal difference between the known analogue AGCs and the system according to the invention is that in the latter the microprocessor has control of the gain setting and can therefore store the gain used for each feature extracted. After the utterance has finished, the microprocessor can determine the optimum gain setting for the complete utterance. All the features stored are then normalised to this optimum gain setting. By this means a consistent set of features are extracted independent of the input signal gain.

Embodiments of the invention will be further described and explained with reference to the accompanying drawing, in which FIG. 1 is a schematic diagram of a speech recogniser according to the present invention.

Throughout this description the invention is described with reference to a speech recogniser utilising template-matching, but as those skilled in the art will be aware, the invention is equally applicable to any of the conventional types of speech recogniser, including those using stochastic modelling, Markov chains, dynamic-timewarping and phoneme-recognition.

Speech recognition is based on comparing energy contours from a number (generally 8 to 16) of filter channels. While speech is present, the energy spectrum from each filter channel is digitized with an Analogue to Digital (A-D) converter to produce a template which is stored in a memory.

The initial stage of recognition is known as 'training' and consists of producing reference templates by speaking to the recogniser the words which are to be recognised. Once reference templates have been made for the words to be recognised, recognition of speech can be attempted.

When the recogniser is exposed to an utterance, it produces a test template which can be compared with the reference templates in the memory to find the closest match.

The fundamental elements of speech recogniser according to the present invention are shown in FIG. 1. Voice signals received by the microphone 1 and amplified by amplifier 2 are passed to a filter bank 3a. In the filter bank the voice signals are filtered into a plurality (in this case 16) of frequency bands, and the signals are rectified by rectifier 4. The filtered and rectified signals are smoothed by low pass filters 3b and then sequentially samples by a multiplexer 5 which feeds the resultant single channel signal to the a digital AGC circuit 8 which in turn feeds an Analogue to Digital converter 6 from which the digitized signal stream is passed to the controlling microprocessor 7.

The multiplexer addresses each filter channel for 20 microseconds before addressing the next one. At the end of each 10 millisecond time slot, each channel's sampled energy for that period is stored. The templates, which are produced during training or recognition, consist of up to 100 time slot samples for each filter channel.

The digital AGC operates in the following way. Each time the multiplexer addresses a filter channel, the microprocessor assesses the channel's energy level to determine whether the A-D convertor has been overloaded and hence that the gain is too high. When the microprocessor determines that the gain is too high it decrements the AGC's gain by 1 step, which corresponds to a reduction in gain of 1.5 dB, and looks again at the channel's energy level. The multiplexer does not cycle to the next channel until the microprocessor has determined that the gain has been reduced sufficiently to prevent overloading of the A-D converter. When the multiplexer does cycle to the next filter channel, the gain of the AGC circuit is held at the new low level unless that level results in the overloading of the A-D converter with the new channel's energy level, in which case the gain is incremented down as previously described. When the multiplexer has addressed the final filter channel, the microprocessor normalises the energy levels of all the channels by setting their gain coefficients (which have been stored together with the energy level information in memory 9 associated with the microprocessor) to the new minimum established by the microprocessor, the magnitudes of the corresponding stored spectral values being adjusted proportionally. In this way a consistent set of features are extracted independent of the initial input signal gain and any changes in the gain during formation of the template.

The speech recogniser is also required to detect the beginning and end of the speech or word with a high degree of accuracy. The speech recogniser according to the present invention uses the following technique:

A. The energy level of the background noise is measured and stored for 32 time slots (at 10 milliseconds a sample) while simultaneously adjusting (reducing) the gains of the AGC circuit as described above to cope with the maximum noise energy.

B. The maximum energy sample is found by adding all the filter values for each time slot, dividing by 16 (the number of filter channels) and multiplying by a gain factor corresponding to the gain of the DAGC circuit, and then comparing the time slots to find the maximum.

C. The threshold which needs to be exceeded before speech is deemed to be present is set to be equal to 1.5 times the maximum noise energy determined in Step B.

D. The average noise energy for each filter channel is found and stored (for each channel it is the sum of energies over all 32 time slots, divided by 32) to establish a noise template.

E. Thereafter, the filter bank is scanned every 10 milliseconds and the data is stored in a temporary cyclic store, of 100 time samples, until the average filter energy exceeds the noise/speech threshold calculated in C.

F. If the noise/speech threshold is not exceeded after 32 samples, a check is performed to ensure that the gain of the DAGC circuit is not set too low. This is done by looking at the maximum filter channel value stored in those 32 time slots. If that maximum level is 1.5 dB or more below the maximum acceptable input level for the A-D converter, the gain of the AGC is incremented by 1 to increase the gain by 1.5 dB. If the threshold is not exceeded after 32 samples and the DAGC setting is correct, then the noise/speech threshold is recalculated by finding the maximum energy over the last 32 samples (as in B) and multiplying by 1.5 (as in C).

G. Once the noise/speech threshold has been exceeded the filter bank is scanned every 10 milliseconds and the filter data is stored in memory, to form the speech templates, until either 100 samples have been entered or until the energy level drops below the noise/speech threshold for 20 consecutive samples. As described above, if during the data input the A-D converter is overloaded, the AGC setting is decremented by 1 and the data for that filter channel is reprocessed. If during the scan of the 16 filter channels the gain of the DAGC circuit is reduced, the data from all 16 channels is re-input so that all the filter data corresponds to the same AGC setting. The AGC value used is recorded in memory along with the filter data. The AGC setting used at the start of each time slot is taken from the previous time frame, hence the gain can only be reduced (not increased) during the speech processing phase. This is not a problem since at the end of the template period all the template data is normalised to a uniform AGC setting.

H. To ensure that the start of speech was not missed by the speech/noise detector threshold, the 15 time samples prior to speech detection are transferred from the temporary cyclic store to the front of the 'speech' template.

I. If more than 100 samples were processed prior to speech being detected, the noise template is recalculated by analysing (as in D) the oldest 32 time frames in the temporary cyclic store. If less than 100 samples were processed prior to speech being detected, the noise template established in step D is used in the following steps.

J. The minimum gain setting of the AGC over the speech template is then found and both the speech and noise templates are normalised to this setting, which results in both templates containing the values that would have been entered had that gain been used from the start.

K. The normalised noise template is then subtracted from every time frame of the normalised speech template.

L. The maximum energy in the normalised speech template is now found and a new noise/speech threshold calculated—equal to the maximum energy minus 18 dB. This new threshold is used to scan the normalised speech template to determine the start and finish points of the speech.

M. The speech template is then truncated to the start and finish points and is either stored in memory (training) or is used for recognition. The following tabular example represents the values stored after measuring the background noise for 320 milliseconds (32 time slots of 10 milliseconds each).

| | DAGC | | Filter bank number. | | | | | | | | | | | | | | | Real AV energy |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| TIME | 4 | 210 | 220 | 232 | 245 | 224 | 216 | 167 | 188 | 176 | 234 | 250 | 177 | 134 | 170 | 213 | 209 | 408 |
| FRAMES | 4 | 210 | 218 | 230 | 250 | 220 | 222 | 170 | 190 | 173 | 230 | 255 | 170 | 137 | 172 | 215 | 212 | 409 |
| ↓ | 4 | 210 | 222 | 234 | 247 | 216 | 225 | 171 | 189 | 178 | 233 | 253 | 171 | 140 | 170 | 214 | 208 | 410 |
| ↓ | 4 | 213 | 220 | 231 | 251 | 218 | 223 | 166 | 184 | 174 | 230 | 250 | 168 | 133 | 165 | 220 | 216 | 408 |
| ↓ | 4 | 215 | 217 | 228 | 253 | 220 | 220 | 160 | 186 | 180 | 231 | 254 | 166 | 132 | 164 | 223 | 220 | 409 |
| ↓ | 4 | 210 | 220 | 232 | 245 | 224 | 216 | 172 | 187 | 177 | 235 | 253 | 160 | 130 | 172 | 214 | 207 | 407 |
| ↓ | 4 | 210 | 220 | 232 | 245 | 224 | 216 | 167 | 188 | 176 | 234 | 250 | 177 | 134 | 170 | 213 | 209 | 408 |

-continued

| DAGC | | Filter bank number. | | | | | | | | | | | | | | | Real AV energy |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | |
| ↓ | 4 | 211 | 218 | 230 | 250 | 220 | 222 | 170 | 190 | 173 | 230 | 255 | 170 | 137 | 172 | 215 | 212 | 409 |
| ↓ | 4 | 210 | 222 | 234 | 247 | 216 | 225 | 171 | 189 | 178 | 233 | 253 | 171 | 140 | 170 | 214 | 208 | 410 |
| ↓ | 4 | 213 | 220 | 231 | 251 | 218 | 223 | 166 | 184 | 174 | 230 | 250 | 168 | 133 | 165 | 220 | 216 | 408 |
| ↓ | 4 | 215 | 217 | 228 | 253 | 220 | 220 | 160 | 186 | 180 | 231 | 254 | 166 | 132 | 164 | 223 | 220 | 409 |
| ↓ | 4 | 210 | 220 | 232 | 245 | 224 | 216 | 172 | 187 | 177 | 235 | 253 | 160 | 130 | 172 | 214 | 207 | 407 |
| ↓ | 4 | 210 | 220 | 232 | 245 | 224 | 216 | 167 | 188 | 176 | 234 | 250 | 177 | 134 | 170 | 213 | 209 | 408 |
| ↓ | 4 | 211 | 218 | 230 | 250 | 220 | 222 | 170 | 190 | 173 | 230 | 255 | 170 | 137 | 172 | 215 | 212 | 409 |
| ↓ | 4 | 210 | 222 | 234 | 247 | 216 | 225 | 171 | 189 | 178 | 233 | 253 | 171 | 140 | 170 | 214 | 208 | 410 |
| ↓ | 4 | 213 | 220 | 231 | 251 | 218 | 223 | 166 | 184 | 174 | 230 | 250 | 168 | 133 | 165 | 220 | 216 | 408 |
| ↓ | 4 | 215 | 217 | 228 | 253 | 220 | 220 | 160 | 186 | 180 | 231 | 254 | 166 | 132 | 164 | 223 | 220 | 409 |
| ↓ | 4 | 210 | 220 | 232 | 245 | 224 | 216 | 172 | 187 | 177 | 235 | 253 | 160 | 130 | 172 | 214 | 207 | 407 |
| ↓ | 4 | 210 | 220 | 232 | 245 | 224 | 216 | 167 | 188 | 176 | 234 | 250 | 177 | 134 | 170 | 213 | 209 | 408 |
| ↓ | 4 | 211 | 218 | 230 | 250 | 220 | 222 | 170 | 190 | 173 | 230 | 255 | 170 | 137 | 172 | 215 | 212 | 409 |
| ↓ | 4 | 210 | 222 | 234 | 247 | 216 | 225 | 171 | 189 | 178 | 233 | 253 | 171 | 140 | 170 | 214 | 208 | 410 |
| ↓ | 4 | 213 | 220 | 231 | 251 | 218 | 223 | 166 | 184 | 174 | 230 | 250 | 168 | 133 | 165 | 220 | 216 | 408 |
| ↓ | 4 | 215 | 217 | 228 | 253 | 220 | 220 | 160 | 186 | 180 | 231 | 254 | 166 | 132 | 164 | 223 | 220 | 409 |
| ↓ | 4 | 210 | 220 | 232 | 245 | 224 | 216 | 172 | 187 | 177 | 235 | 253 | 160 | 130 | 172 | 214 | 207 | 407 |
| ↓ | 4 | 210 | 222 | 234 | 247 | 216 | 225 | 171 | 189 | 178 | 233 | 253 | 171 | 140 | 170 | 214 | 208 | 410 |
| ↓ | 4 | 213 | 220 | 231 | 251 | 218 | 223 | 166 | 184 | 174 | 230 | 250 | 168 | 133 | 165 | 220 | 216 | 408 |
| | 4 | 215 | 217 | 228 | 253 | 220 | 220 | 160 | 186 | 180 | 231 | 254 | 166 | 132 | 164 | 223 | 220 | 409 |
| | 4 | 210 | 220 | 232 | 245 | 224 | 216 | 172 | 187 | 177 | 235 | 253 | 160 | 130 | 172 | 214 | 207 | 407 |
| | 4 | 210 | 220 | 232 | 245 | 224 | 216 | 167 | 188 | 176 | 234 | 250 | 177 | 134 | 170 | 213 | 209 | 408 |
| | 4 | 211 | 218 | 230 | 250 | 220 | 222 | 170 | 190 | 173 | 230 | 255 | 170 | 137 | 172 | 215 | 212 | 409 |
| | 4 | 213 | 220 | 231 | 251 | 218 | 223 | 166 | 184 | 174 | 230 | 250 | 168 | 133 | 165 | 220 | 216 | 408 |
| | 4 | 215 | 217 | 228 | 253 | 220 | 220 | 160 | 186 | 180 | 231 | 254 | 166 | 132 | 164 | 223 | 220 | 409 |
| Average noise template:- | | | | | | | | | | | | | | | | | | |
| | | 212 | 219 | 231 | 248 | 220 | 220 | 167 | 187 | 176 | 232 | 252 | 169 | 134 | 169 | 217 | 212 | |

A DAGC value of 4 is equivalent to a 6 dB attenuation of the signal going into the A/D, hence to calculate the "real" energy all the filter bank values above would have to be doubled.

Maximum real energy (averaged over all filters) was: 410

Threshold to be exceeded to start/end template recording: 615.

Because the invention's primary application is to voice recognition it has been described with reference to that application. However, as those skilled in the art will be aware, the invention is not only applicable to voice recognition, but is applicable to practically any situation where voice signals are processed for feature extraction.

The speech processor according to the present invention is particularly suitable for use in applications where background noise and variations in the level of that background noise are a problem for known speech processors. One such application is in hands-free telephony, and in particular hands-free telephony involving cellular radio terminals. Such terminals are frequently used in cars, where it is convenient to use speech recognition to provide hands-free call connection and dialling. The problem arises however that wind, road and engine noise fluctuate widely and make accurate recognition of speech difficult. Clearly, if speech recognition for hands-free telephony is to be fully acceptable in this application it is necessary that the recogniser accepts and acts correctly in response to voiced commands in the presence of background noise, without routinely requiring that the commands be repeated.

The improved accuracy of recognition provided by the present invention is of particular advantage in this application.

I claim:

1. A speech processor comprising:
an input to receive speech signals;
signal processing means connected to extract spectral parameters from said speech signals;
an analogue to digital converter connected to digitise said extracted parameters over a sampling period;
an automatic gain control means connected to control the signal level applied to said converter;
means to store, at least temporarily, the spectral parameters and, for each such stored parameter, to also store a gain coefficient indicative of the gain applied by the gain control means; and
adjustment means operable at intervals to perform an adjustment process in which the gain coefficients stored in said period are, if different, set equal to the lowest gain coefficient stored since the previous adjustment period, the magnitudes of the corresponding stored spectral parameters also being adjusted proportionally.

2. A speech processor as in claim 1 wherein said adjustment means includes control means connected to cause each extracted spectral parameter to correspond to the energy content of a particular frequency band in a time slot of length t, and to determine for each extracted parameter, the signal level applied to the analogue to digital converter in a small fraction of the time t, and if the signal level is greater than a predetermined level reducing the gain and re-assessing the signal level, the signal level assessment and the gain reduction being repeated within time slot t until the signal level is at a finalised level not exceeding said predetermined level.

3. A speech processor as in claim 2 wherein said control means causes said predetermined level to be equal to the maximum level which does not exceed the dynamic range of the analogue to digital converter.

4. A speech processor as in claim 2 or claim 3 wherein said control means causes spectral parameters to be established in a single time slot of length t for a plurality of discrete frequency bands, and causes the different frequency bands to be addressed sequentially, with the finalised gain coefficient of any frequency band being used as the initial gain coefficient of the next addressed frequency band.

5. A speech processor as in claim 2 or 3 wherein the control means causes the sampling period to be made up of a plurality of time slots of length t.

6. A speech processor as in claim 1, 2, or 3, configured as a speech recogniser.

7. A speech processor as in claim 1, 2 or 3, wherein the control means comprises a microprocessor and the gain control means comprises a digitally switched attenuator under the control of the microprocessor having an input connected to a digitised output of the analogue to digital converter, the gain of the attenuator being determined by the microprocessor.

8. A cellular radio terminal comprising:
a speech recogniser for selecting functions in response to voiced instructions, characterised in that the speech recogniser comprises a speech processor as claimed in claim 1, 2 or 3.

9. A speech processor comprising:
an input for receiving speech signals;
signal processing means for extracting spectral parameters from said speech signals;
automatic gain control means for controlling the magnitudes of said parameters;
means for storing, at least temporarily, said gain-controlled parameters and gain coefficients indicative of the gains applied to the parameters by said gain control means; and
adjustment means operative at intervals to perform an adjustment process comprising examining the coefficients relating to the parameters stored since the previous such adjustment process and, if they are different, adjusting the parameter magnitudes such that all those parameters have magnitudes corresponding to a single value of gain coefficient.

10. A speech processor comprising:
filtering means connected to receive an input speech signal for separating said speech signal into a plurality of spectral components;
amplifier means for sequentially amplifying said plurality of spectral components by corresponding signal gain factors;
converter means connected to receive said amplified speech signal for converting said amplified plurality of spectral components into digital signals representing said spectral components;
means for measuring said signal gain factors;
means connected to said measuring means and to said converter means for storing said digital signals representing said spectral components and for also storing said measured gain factors corresponding to said spectral components; and
means for adjusting the value of stored spectral components associated with at least an initial portion of said speech signal so as to be based on different signal gain factors derived, at least in part, on gain factors used to derive subsequent spectral components of said speech signal.

11. A processor as in claim 10 wherein said means for adjusting produces outputs spectral component data for the entire input speech signal referenced to a single common gain factor.

12. A speech processor comprising:
spectral analysis means connected to receive input speech signals and to provide measured spectral parameter data therefrom and including an automatic gain adjustment means for adjusting the level of speech signal components being measured but which, upon the initial portion of a speech signal may inherently provide excessive signal gain which gain is thereafter automatically adjusted to lesser levels during the continuing speech signal occurrence; and
data storage and adjusting means for storing and subsequently reducing excessive signal gain factors associated with the speech signal components during at least said initial portion of a speech signal to produce an approximately uniform effective signal gain over the entire speech signal occurrence thereby producing more reliably recognizable measured spectral parameter data.

13. A speech processor comprising:
a speech signal input;
plural frequency band pass filter channels connected to receive speech signals from said input and to respectively provide spectral outputs representing the input speech signal content within corresponding frequency bands;
a multiplexer connected to receive said spectral outputs and to select one such spectral output as a function of first digital control signals supplied thereto;
a digitally controlled automatic gain control circuit connected to receive said selected spectral output and to apply a selected gain factor thereto as a function of a second digital control signals supplied thereto;
an analog-to-digital converter connected to receive gain-adjusted signals from the gain control circuit and to supply digitized spectral signals corresponding thereto; and
a digital control unit connected to supply said first and second digital control signals so as to periodically sample and gain adjust said spectral outputs and including a digital data memory connected to receive and store both (a) said digitized spectral signals and (b) the gain factor used in the automatic gain control circuit to generate such digitized spectral signals;
said digital control unit including means for subsequently adjusting the values of digital spectral signals corresponding to an initial portion of a speech signal so as to be based on a lower gain factor derived, at least in part, from gain factors utilized for later occurring portions of the speech signal.

14. A speech processing method comprising:
filtering an input speech signal into a plurality of spectral components;
sequentially amplifying said plurality of spectral components by corresponding signal gain factors;
converting said amplified plurality of spectral components into digital signals representing said spectral components;
measuring and storing said digital signals representing (a) spectral components of an input speech signal and (b) said corresponding signal gain factors; and
adjusting the value of stored spectral components associated with at least an initial portion of said speech signal so as to be based on different signal gain factors used to derive subsequent spectral components of said speech signal.

15. A speech processing method as in claim 14 wherein said adjusting step includes producing output spectral component data for the entire input speech signal referenced to a single common gain factor.

16. A speech processing method comprising:

receiving input speech signals and providing measured spectral parameter data therefrom including an automatic gain adjustment adjusting the level of speech signal components being measured but which, upon the initial portion of a speech signal may inherently provide excessive signal gain which gain is thereafter automatically adjusted to lesser levels during the continuing speech signal occurrence; and storing and subsequently reducing excessive signal gain factors associated with the speech signal components during at least said initial portion of a speech signal to produce an approximately uniform effective signal gain over the entire speech signal occurrence thereby producing more reliably recognizable measured spectral parameter data.

17. A speech processing method comprising:

receiving input speech signals and providing plural spectral outputs representing the input speech signal content within corresponding frequency bands;

receiving said spectral outputs and selecting one such spectral output as a function of first digital control signals;

applying a selected gain factor to said selected spectral output as a function of second digital control signals;

converting said gain-adjusted signals from the gain control circuit to digitized spectral signals corresponding thereto;

supplying said first and second digital control signals to successively sample and gain adjust said spectral outputs and storing both (a) said digitized spectral signals and (b) the gain factor used in the automatic gain control circuit to generate such digitized spectral signals; and subsequently adjusting the values of digital spectral signals corresponding to an initial portion of a speech signal so as to be based on a lower gain factor derived, at least in part, from gain factors utilized for later occurring portions of the speech signal.

18. A speech processing method comprising:

(a) storing successive spectral parameters derived from periodically sampling an input speech signal which has been subjected to automatic gain control;

(b) also storing gain data representing the gain factors used to successively derive such stored spectral parameters; and (c) subsequently adjusting the stored spectral parameters representing an initial portion of an input speech signal to reduced values in compensation for an initially excessive gain factor.

19. A speech processing method as in claim 18 wherein said adjusting step changes said stored spectral parameters to values which would have been recorded if a uniform constant gain factor had been used for the entire speech signal.

* * * * *